United States Patent
Bouchard et al.

(10) Patent No.: US 7,590,573 B1
(45) Date of Patent: Sep. 15, 2009

(54) SYSTEM AND METHOD FOR TRANSFERRING ASSETS BETWEEN DEPRECIATION BOOKS

(75) Inventors: Brian Bouchard, Huntley, IL (US); Jeffrey Bisson, Frisco, TX (US)

(73) Assignee: Chi-Star Technology, Algonquin, IL (US)

( * ) Notice: Subject to any disclaimer, the term of this patent is extended or adjusted under 35 U.S.C. 154(b) by 212 days.

(21) Appl. No.: 11/786,894

(22) Filed: Apr. 14, 2007

(51) Int. Cl.
  *G06F 15/18* (2006.01)
(52) U.S. Cl. .................... 705/33; 705/405; 705/30; 705/31; 705/404
(58) Field of Classification Search .............. 705/33, 705/30, 31, 404, 405
  See application file for complete search history.

(56) References Cited

U.S. PATENT DOCUMENTS

| | | | |
|---|---|---|---|
| 5,950,171 A * | 9/1999 | Madell | 705/7 |
| 6,330,547 B1 * | 12/2001 | Martin | 705/38 |
| 7,043,448 B2 * | 5/2006 | Campbell | 705/31 |
| 2002/0035533 A1 * | 3/2002 | Mache et al. | 705/37 |
| 2002/0143673 A1 * | 10/2002 | Hitchings et al. | 705/30 |
| 2003/0126047 A1 * | 7/2003 | Hollar et al. | 705/30 |
| 2003/0126048 A1 * | 7/2003 | Hollar et al. | 705/30 |
| 2003/0139985 A1 * | 7/2003 | Hollar et al. | 705/30 |
| 2004/0172318 A1 * | 9/2004 | Shen | 705/7 |
| 2004/0215544 A1 * | 10/2004 | Formale et al. | 705/36 |
| 2007/0162365 A1 * | 7/2007 | Weinreb | 705/35 |
| 2008/0010176 A1 * | 1/2008 | Mukhami et al. | 705/30 |

OTHER PUBLICATIONS

Knaster, Barry, Fixed Asset Round-Up: Part I, Sep. 1996, Business and Management Practices, vol. 12 No. 8 ISSN: 1068-6452, p. 22-24, 26.*

* cited by examiner

*Primary Examiner*—F. Zeender
*Assistant Examiner*—Fateh M Obaid
(74) *Attorney, Agent, or Firm*—Clifford Kraft

(57) ABSTRACT

A system and method for transferring an asset, or assets, from a first depreciation book to a second depreciation book possibly in different currencies. In particular a method for automatically transferring an asset from a first depreciation book to a second depreciation book with the steps of: gathering asset information from the first depreciation book including original currency for the asset; gathering details of transfer including new currency for the asset and date of transfer; determining the financial treatment of the asset; determining a translation rate between the original currency and said new currency based on the date of transfer; computing financial parameters for the asset in the new currency; retiring the asset from the old depreciation book and creating the asset in the new depreciation book; creating journal entries for the transfer. All of these steps are generally performed while maintaining an audit trail of the transfer.

9 Claims, 2 Drawing Sheets

SYSTEM AND METHOD FOR TRANSFERRING ASSETS BETWEEN DEPRECIATION BOOKS

BACKGROUND

1. Field of the Invention

The present invention relates generally to the field of computerized fiscal bookkeeping and more particularly to a system and method for transferring assets from a particular set of depreciation books to another.

2. Description of the Prior Art

It is well known in the field of accounting for companies to depreciate assets for tax purposes. An asset can be anything of value owned by the company. The United States Internal Revenue Service (through laws enacted by Congress) determines exactly what assets can be depreciated. Other countries also may allow depreciating an asset. Depreciating means reducing the value of an asset each year according to a particular formula.

It is also well known to keep records of depreciating assets in computer databases such as the Oracle Assets System supplied by Oracle Corporation of Redwood Shores Calif. Records of depreciating assets are generally kept in database entries called depreciation books (exactly as physical books were kept before computerized accounting). Each depreciating asset is entered into one of these books (which are part of a relational database) along with various parameters such as its identification in the system (asset number, asset description, serial number, tag number, etc.), parameters about what type of asset it is and how it should be depreciated (asset category) and various other information relating to the asset.

Generally, companies maintain many different asset books, with different parts of the same company maintaining asset books in different databases and in different countries. A major problem arises when a particular asset must be transferred from one asset book to another. The problem is difficult when the asset is transferred between books in a single country; the problem becomes extremely difficult when an asset is to be transferred between books maintained in two different countries with different currencies.

Presently, transferring of an asset from one depreciation book to another is a manual process. This process requires manual interaction with several databases and is very error prone because of the numerous manual steps. Unfortunately, it is a daily occurrence in many multi-national companies.

The first step of the current process is to determine the asset or assets that will be transferred. The assets department of a company must make this determination based on information received from the field. Usually an asset number, asset description, serial number, tag number, asset key or other identifying feature of the asset is supplied to the assets department. The first task is thus finding the asset in the correct depreciation book. To manually access books in the Oracle Asset System, the user must be trained to use the Asset Workbench. This is a user interface and set of tools for manual use of the database. Other databases have similar interfaces.

After the asset is manually identified in the correct asset book, the asset must be retired. This means that the user must issue manual commands to remove the asset from the old depreciation book. Once the asset is removed from the old book, it is "floating"—i.e. not in any book. If for some reason it is not entered into a new book, it will become lost to the system. It is estimated that large companies have numerous assets that have become lost to the system because of human error.

After the asset is retired from the current depreciation book, it must be manually entered into the new depreciation book. Depending on the type of asset, there may be different ways it can be entered. The human operator must determine if only the asset cost is to be transferred, only the net book value (NBV) or if the cost, year-to-date depreciation and accumulated depreciation should be carried over. The human must also determine if the asset should be placed on the new book to amortize the NBV or not.

Before any values or costs can be transferred, the asset must be translated from the original currency to the new currency associated with the new depreciation book if it is in a foreign country. Therefore, the human operator must gather the currency type of the asset in the old book and determine the currency type of the new book. Then, the translation rate for the two currencies for the date of transfer must be determined. With Oracle databases, the translation rates are normally housed in the Oracle General Ledger. The asset department must usually either log into the General Ledger system or have someone with access get the required translation rate. Once the translation rate is determined, the human operator must calculate the values required for the transfer (i.e. cost, NBV, year to date depreciation, accumulated depreciation, etc.) in the new currency. This is another source of error where the new values are calculated wrong or the wrong translation rate is used.

The human operator must then add the asset to the new depreciation book. Normally this is done with some type of "create asset:" command along with the entering of the required information. If the asset is added to the new book with wrong data (wrong numbers), the error generally cannot be detected.

As a final step, the human operator must create journal entries for the entire process (journal entries are part of standard accounting procedure used to credit and debit various accounts). For the old depreciation book (asset retirement), there must normally be a debit of the Inter-Company Receivables and a credit to the Gain and Loss accounts. For the new depreciation book (asset addition), there must be a debit of the Asset Clearing Account, a credit of the Inter-Company Payables and a Credit to the Accumulated Depreciation.

In the prior art manual process just described there is no continuity of the audit trail for the asset—in fact, the audit trail is completely lost. The old audit trail ends when the asset is retired from the old book, and a new separate audit trail begins when the asset is created in the new book. From the point of view of tracking, the asset is totally lost from one set of books and a brand new asset is added to another set of books. It is currently almost impossible to check that there was no human error (or fraud) in the transfer.

It would be advantageous to have an automated system and method for transferring an asset from one depreciation book to another. This system and method would remove all of the human operator steps from the above process and run checks to make sure that all the steps are correctly performed. The system and method would virtually eliminate the possibility of human error or fraud from the process as well as providing back-up in case of computer failures as well as generated reports documenting the transfer. The automated system and method would maintain the audit trail.

SUMMARY OF THE INVENTION

The present invention relates to a system and method for transferring an asset, or assets, from a first depreciation book to a second depreciation book possibly in different currencies. In particular, an embodiment of the invention is a method for automatically transferring an asset from an old depreciation book to a new depreciation book with the steps of: gathering asset information from the first depreciation book including original currency for the asset; gathering details of transfer including new currency for the asset and date of transfer; determining the financial treatment of the asset; determining a translation rate between the original currency and said new currency based on the date of transfer; computing financial parameters for the asset in the new currency; retiring the asset from the old depreciation book and creating the asset in the new depreciation book; creating journal entries for the transfer. All of these steps are generally performed while maintaining an audit trail of the transfer. Information concerning the transfer can be entered into a computer readable form.

DESCRIPTION OF THE DRAWINGS

Reference is now made to the following figures.

Several drawings and illustrations have been presented to aid in the understanding of the present invention. In no case is the scope of the present invention limited to what is shown in the figures.

DESCRIPTION OF THE INVENTION

The present invention relates to transferring an asset from a first depreciation book to a second depreciation book in general when the values in the books are in different currencies and possibly different form while maintaining a continuous audit trail of the transfer. The depreciation books are generally kept in an accounting database like Oracle Asset System supplied by Oracle Corporation of Redwood Shored, Calif.

Embodiments of the present invention can take the form of software programs that execute on a digital computer to execute the various steps of the transfer of the asset. The preferred embodiment of the invention runs in conjunction with database systems supplied by Oracle that are normally accessed by query commands in a language known as SQL or SEQUEL. While SQL is used generally with relational databases and is preferred, it should be understood that the invention can be programmed in any language the runs on any type of computer under any operating system or relational database. SQL is a standardized database query language that is used to access and manipulate entries in a relational database. SQL is a declarative programming language, not an imperative language like C++ or Java. However, there exist extensions to SQL that allow imperative operations as well as the ability to access imperative languages like Java through the database.

Depreciation is a term used in accounting to describe a process where assets with finite lives lose value over time. Depreciation is generally used by companies in connection with tax accounting. In corporate accounting systems, records of depreciating assets are kept in depreciation books. In computerized accounting, these books are kept in a relational database like Oracle Asset System. Assets are automatically depreciated according to accepted accounting principles and tax law. Queries on assets in depreciation books can be made from programs using SQL commands or manually using tools like the Asset Workbench supplied by Oracle Corporation.

The present invention provides a software method that uses SQL commands to transfer assets from one depreciation book to another, and is especially useful when values in the two books are in different currencies and/or the asset is to be valued or managed differently in the two books.

Figure 1:
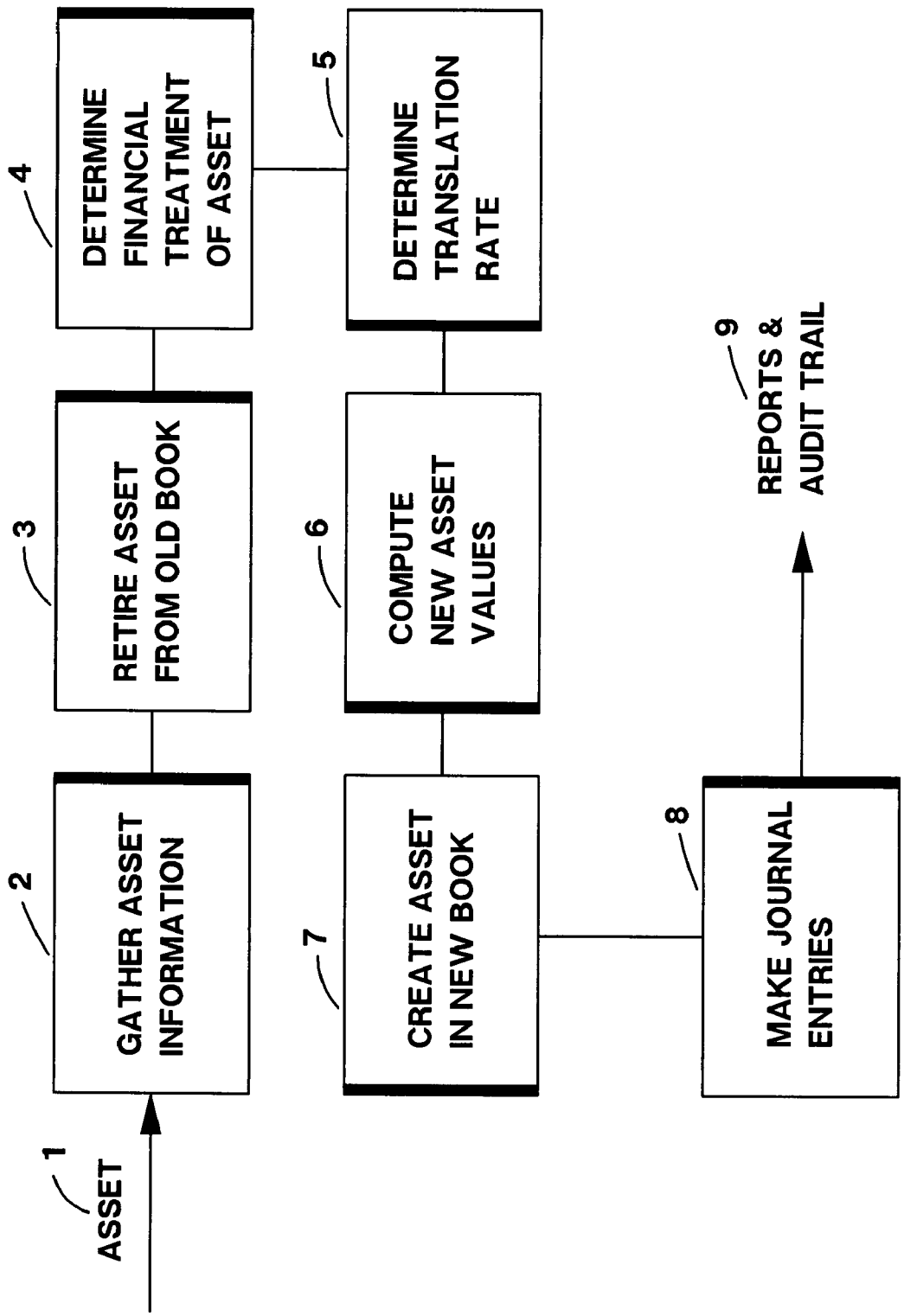
FIG. 1 is a flow chart of an embodiment of the present invention.

Turning to FIG. 1, an overview flow chart of an embodiment of the present invention can be seen. An asset 1 is specified by data from the field. The present invention uses a form to enter data sufficient to locate the asset in the original or "old" depreciation book. While the term "asset" is used in this discussion and in the figures, it should be understood that multiple assets may be entered simultaneously and transferred together from a first depreciation book to a second. Data used to locate the asset may be an asset description or name, a tag number, a serial number, an asset key, or any other information sufficient to identify the asset. The system of the invention locates the asset in the old book and gathers asset information 2 that is stored in the old book concerning the asset. While the actual data gathered about an asset my vary between different books and accounting systems, in an example could be an asset description, an asset category, a tag number, a serial number, an asset key and any other data stored concerning the asset. In general, this data will automatically be transferred by the system of the invention with the asset to the new book, although, the invention also allows this data to optionally be modified by the user so that it appears different in the new book.

The system next determines if the transfer will be a full or partial transfer. It is possible to partially transfer an asset based on cost. The system can determine the value to be transferred. Details of whether the transfer is full or partial can be entered by the user on a form that is read by the system.

The next step that is performed totally automatically by the system of the invention is to retire the asset 3 from the old book. This is done by the program by executing a sequence of SQL commands that retire the asset. Generally the system must supply certain data to the database to accomplish including depreciation book, retirement date, units or cost retired, proceeds and cost of removal. The invention retires the asset by causing the Gains and Loss program to run. All data concerning the retired asset is kept so that a continuous audit trail can be maintained.

Assets are depreciated using methods according to accepted accounting procedures and tax law. Asset values include cost, net book value (NBV), year-to-date depreciation, accumulated depreciation and others. The user has the option of specifying the financial treatment of the asset in the new book. For example, should only the asset cost be transferred, only the NBV, or should the cost, year-to-date depreciation and accumulated depreciation be carried over from the old book. All of these (or any that are transferred) must be entered into the new book in the currency used by the new book.

The user can enter the old currency (or it can be determined automatically from the old book), the new currency (or it can be determined automatically from the new book) and the transfer date (which can be generated automatically if it is the current date). The system of the invention can then go into the General Ledger to determine the translation rate 5 to be used from the old currency to the new currency based on the transfer date. Alternatively, the translation rate can be entered into the system. The preferred method is to determine it automatically from the General Ledger since human entry is always subject to error and security concerns. A particular example might be an asset valued in U.S. dollars in the asset book for a U.S. company. This asset is to be transferred as of Jan. 1, 2007 to the asset book for the German subsidiary. The values in the German book are in Euros. The transfer is taking place on Feb. 1, 2007. The system of the present invention will go into the company's General Ledger and determine a translation rate between dollars and Euros for the date Jan. 1, 2007 (which for purposes of example might have been 1.33 Euros/dollar) This will be the correct translation rate for the transfer.

Once the correct translation rate is determined, the system of the invention computes new asset values 6. These are simply the asset values to be transferred (or newly created) in the new currency. This is accomplished by multiplying values in the old currency by the translation rate.

The system of the invention next creates the asset in the new book using the new asset values in the new currency. This is done automatically by entering the correct SQL commands to create an asset. The numbering convention for the new asset is determined so that the audit trail can be maintained, and it is possible to get back to the original asset.

The final task the system of the invention must perform is to make the correct journal entries 8. This must be done according to accepted accounting principles and according to the various accounts maintained by the company. According to the prior art, when the method was done manually, Oracle booked the following for the retirement: Debit: Accumulated Depreciation; Debit: Gain/Loss; Credit: Asset Cost. The user would then have to releavee the Gain and Loss account and book the following entries: Debit: Inter-Company Receivables; Credit: Gain/Loss. The present invention performs the entire process correctly automatically by booking the following entries: Debit: Inter-Company Receivables; Debit: Accumulated Depreciation; Credit: Asset Cost.

Finally, the system of the present invention can produce any reports or documentation necessary to report the transfer and maintain the audit trail. Data concerning the transfer can be automatically entered into an appropriate database so that all aspects of the transfer can be retrieved for audit or for general information.

There are several steps taken by the present invention to transfer and asset. A concise list is:
1. Determine the asset to be transferred.
2. Query the asset in the transfer form for transfer details:
   A. Asset Category (if to be changed).
   B. Accounting (if to be changed).
   C. Location (if to be changed).
3. Determine whether to transfer full asset or partially based on cost or units.
4. Determine the financial treatment of the asset transfer.
5. Automatically submit a transfer request (a process that retires the old asset and adds the new asset).
6. Create inter-company journal entries to reflect the transfer.

Figure 2:
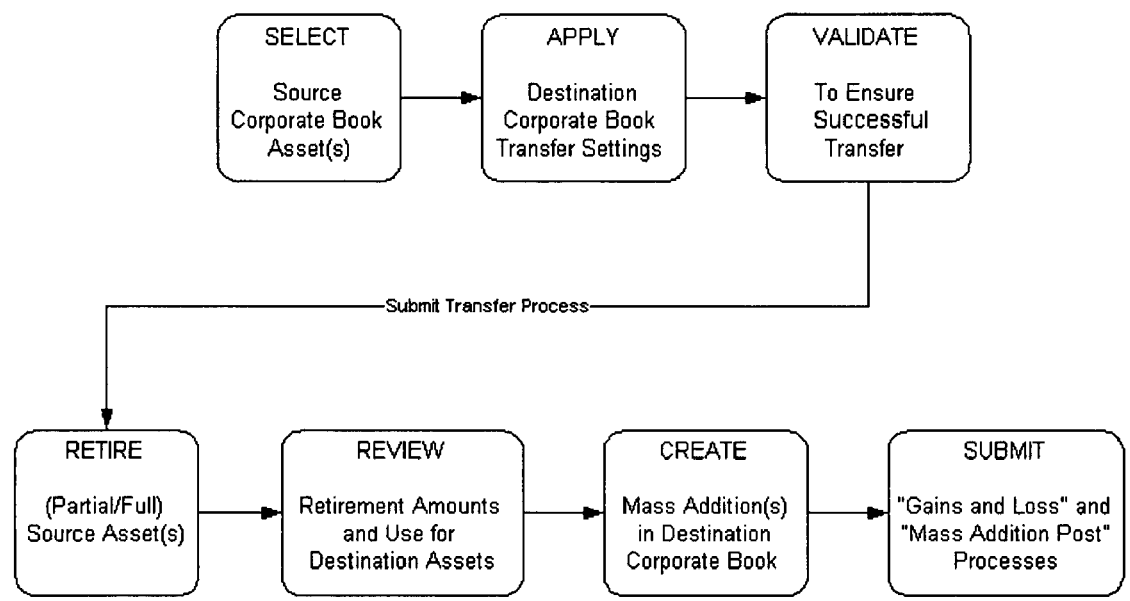
FIG. 2 is a chart showing the steps of the automatic system.

FIG. 2 shows a step chart of the various major steps performed the system of the present invention. The steps are: SELECT: corporate book assets; APPLY: destination corporate book transfer settings; VALIDATE: to ensure successful transfer and prevent errors; RETIRE: partial or full retirement of assets from old book; REVIEW: retirement amounts and use for destination assets; CREATE: assets in destination corporate book; SUBMIT: "Gains and Loss" and "Addition" post processes. The post processes include booking journal entries and making sure there is an audit trail.

One method of maintaining an audit trail in the present invention is to add an extension to the original asset number and then use the same asset number with the extension rather than allowing the database system to arbitrarily assign an asset number. This way the old asset can be found.

Several descriptions and illustrations have been presented to aid in the understanding of the present invention. One with skill in the art will realize that numerous changes and variations can be made without departing from the spirit of the invention. Each of these changes and variations is within the scope of the present invention.

We claim:

1. A method for automatically transferring an asset from a first depreciation book located in a database to a second depreciation book located in a first database, the method comprising:
   automatically using a computer to gather asset information from said first depreciation book including original currency for said asset by accessing said first database with said computer;
   automatically gathering details concerning said transfer including a new currency for said asset and a date of transfer;
   automatically determining financial treatment of said asset;
   automatically determining a translation rate between said original currency and said new currency based on the date of transfer;
   automatically using said computer to compute financial parameters for said asset in said new currency;
   automatically using said computer to retire said asset from an old depreciation book in said first database and adding said asset to said new depreciation book in a second database;
   automatically using said computer to book journal entries concerning said transfer;
   automatically using said computer to maintain an audit trail associated with said asset in said old depreciation book in said first database and said asset in said new depreciation book in said second database.

2. The method of claim 1, wherein said asset information also includes at least asset description, asset category and asset identification.

3. The method of claim 1, wherein said financial treatment of the asset includes at least whether only asset cost is to be transferred or only net book value is to be transferred or whether cost, year-to-date depreciation and accumulated depreciation should be transferred.

4. The method of claim 1, wherein said translation rate is determined by accessing a general ledger in a third database.

5. The method of claim 1, wherein said journal entries include at least a debit to inter-company receivables.

6. The method of claim 1, wherein said journal entries include at least a debit to accumulated depreciation.

7. The method of claim 1, wherein said journal entries include at least a credit to asset cost.

8. The method of claim 1, wherein an asset may be partially transferred.

9. The method of claim 1, wherein accesses to said first and second database use SQL.

* * * * *